US008515669B2

(12) United States Patent
DeMaio et al.

(10) Patent No.: US 8,515,669 B2
(45) Date of Patent: Aug. 20, 2013

(54) PROVIDING AN IMPROVED VIEW OF A LOCATION IN A SPATIAL ENVIRONMENT

(75) Inventors: Pasquale DeMaio, Bellevue, WA (US); Kristoffer Bernt Henriksson, Redmond, WA (US); Blaise Hilary Aguera-Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/823,142

(22) Filed: Jun. 25, 2010

(65) Prior Publication Data

US 2011/0320116 A1 Dec. 29, 2011

(51) Int. Cl.
*G01C 21/36* (2006.01)
*G01S 17/89* (2006.01)

(52) U.S. Cl.
USPC .................................. 701/436; 701/457

(58) Field of Classification Search
USPC ............ 701/433, 436, 454, 457; 340/995.14, 340/995.16
See application file for complete search history.

(56) References Cited

U.S. PATENT DOCUMENTS

| | | | | |
|---|---|---|---|---|
| 5,276,785 | A * | 1/1994 | Mackinlay et al. | 345/427 |
| 6,987,512 | B2 * | 1/2006 | Robertson et al. | 345/427 |
| 7,190,365 | B2 * | 3/2007 | Fleury | 345/427 |
| 7,483,049 | B2 | 1/2009 | Aman et al. | |
| 7,483,057 | B2 | 1/2009 | Grosvenor et al. | |
| 7,589,732 | B2 | 9/2009 | Burtnyk et al. | |
| 7,843,451 | B2 * | 11/2010 | Lafon | 345/423 |
| 8,074,241 | B2 * | 12/2011 | Arfidsson et al. | 725/38 |
| 8,194,073 | B2 * | 6/2012 | Tokita et al. | 345/427 |
| 2001/0034661 | A1 * | 10/2001 | Ferreira | 705/26 |
| 2004/0209684 | A1 | 10/2004 | Hisano | |
| 2007/0124683 | A1 * | 5/2007 | Ranin et al. | 715/733 |
| 2007/0211149 | A1 | 9/2007 | Burtnyk et al. | |
| 2008/0129825 | A1 | 6/2008 | DeAngelis et al. | |
| 2008/0183382 | A1 * | 7/2008 | Asai et al. | 701/210 |
| 2008/0198158 | A1 * | 8/2008 | Iwamura et al. | 345/419 |
| 2009/0153549 | A1 * | 6/2009 | Lynch et al. | 345/419 |
| 2010/0045701 | A1 | 2/2010 | Scott et al. | |
| 2010/0123737 | A1 * | 5/2010 | Williamson et al. | 345/672 |
| 2010/0268457 | A1 * | 10/2010 | McCrae et al. | 701/207 |

FOREIGN PATENT DOCUMENTS

| | | | | |
|---|---|---|---|---|
| JP | 09073553 | A | * | 3/1997 |
| JP | 09097349 | A | * | 4/1997 |
| JP | 2002140731 | A | * | 5/2002 |

OTHER PUBLICATIONS

Google Lat Long Blog entry, "Introducing smart navigation in Street View: double click to go (anywhere!)", Jun. 4, 2009, posted by Daniel Filip, downloaded from http://google-latlong.blogspot.com/2009/06/introducing-smart-navigation-in-street.html.*
Bares, et al., "Virtual 3D Camera Composition from Frame Constraints", Retrieved at << http://citeseerx.ist.psu.edu/viewdoc/download?doi=10.1.1.94.6163&rep=rep1&type=pdf >>, International Multimedia Conference, Proceedings of the eighth ACM international conference on Multimedia, 2000, pp. 10.
Chen, et al., "Camera Placement Considering Occlusion for Robust Motion Capture", Retrieved at << http://graphics.stanford.edu/papers/OcclusionMetric/occlusion_metric.pdf >>, Technical Report, CS-TR-2000-07, 2000, pp. 8.

* cited by examiner

*Primary Examiner* — Mary Cheung
*Assistant Examiner* — David Testardi
(74) *Attorney, Agent, or Firm* — Hope Baldauff, LLC

(57) ABSTRACT

Technologies are described herein for providing an improved view of a location in a spatial environment. A current image associated with a current location of a geographic area is displayed. A user-selected point on the current image is received. A target location of the geographic area is determined based on the user-selected point. A distance between the current location and the target location is determined. A determination is made as to whether the distance between the current location and the target location is greater than a distance threshold. If this distance is greater than the distance threshold, then a far distance process configured to determine and display a first target view of the target location is performed. If this distance is not greater than the distance threshold, then a near distance process configured to determine and display a second target view of the target location is performed.

17 Claims, 10 Drawing Sheets

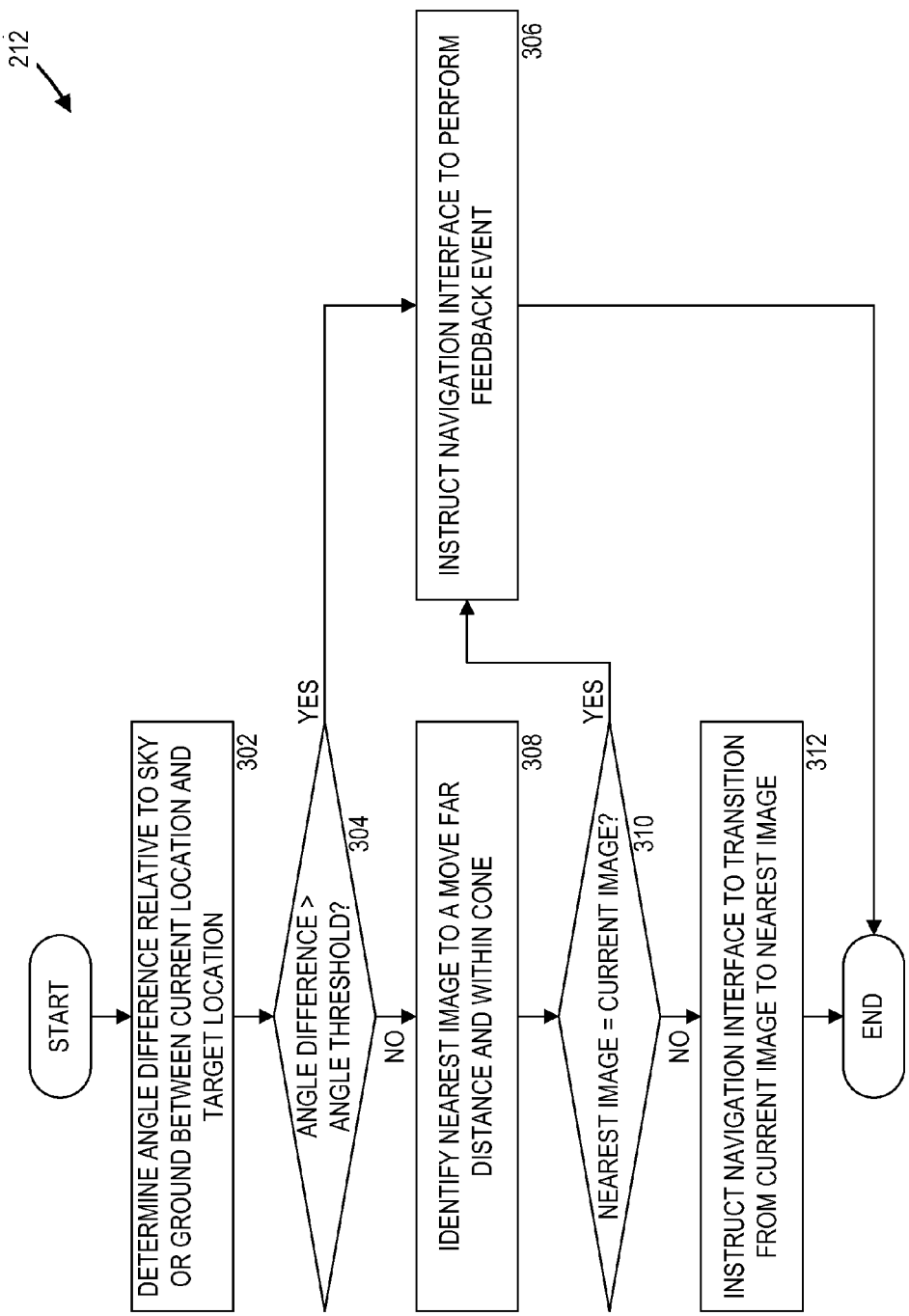

PROVIDING AN IMPROVED VIEW OF A LOCATION IN A SPATIAL ENVIRONMENT

BACKGROUND

Electronic maps have become increasingly pervasive in modern society. Electronic maps were initially distributed through computer-readable storage media and installed and viewed locally on customers' personal computers. Now electronic maps are often provided through web-based map services. In this way, users can view the electronic maps using a web browser. In some cases, these web-based map services also provide interactive functionality, such as zooming in and out of maps, navigating directionally (e.g., north, west, east, south) within the maps, and determining driving directions between two or more points on the maps.

Early electronic maps provided road maps that showed simple graphical renderings of streets and street names. These road maps were primarily used for providing driving directions. In some cases, these road maps also showed points of interest, such as restaurant, parks, museums, and the like. However, the points of interest were typically represented with merely text and/or a generic icon. More recent electronic maps have provided more detailed maps. In particular, these newer electronic maps may show satellite imagery, aerial photography, topographical data, and three-dimensional representations of buildings and other structures in the physical world. Thus, for example, the user can view a realistic representation of a restaurant's structure on the map rather than a generic icon representing the restaurant.

Some Internet-based map services now provide panoramic views of street locations. Through these panoramic views, a user can view and/or navigate street-level images within a three-dimensional representation of the physical world. For example, a user may navigate around a three-dimensional representation of a street and view structures along the street as if the user were actually walking or driving on the street.

One of the challenges with presenting panoramic views of street locations is providing a user interface that allows the user to intuitively navigate the three-dimensional representation as if the user were navigating the real world. However, unlike the real world where the number of views is virtually limitless, the three-dimensional representation is typically composed of a finite number of images (e.g., photographs). As a result, the optimal view at any given location in the three-dimensional representation may not be easily apparent.

It is with respect to these considerations and others that the disclosure made herein is presented.

SUMMARY

Technologies are described herein for providing an improved view of a location in a spatial environment. Through the utilization of the technologies and concepts presented herein, a street-level navigation interface can be configured to select and display an image (e.g., a photograph) that provides a target view at a selected location in a three-dimensional environment. The target view may be selected by analyzing various factors including distance and/or angle. The target view may or may not be the image that is nearest to the selected location. For example, the image nearest to the selected location may be avoided because it provides a poor user experience.

In an example technology, a computer having a memory and a processor is configured to provide an improved view of a location in a spatial environment. The computer displays a current image associated with a current location of a geographic area. The computer receives a user-selected point on the current image. The computer determines a target location of the geographic area based on the user-selected point. The computer determines a distance between the current location and the target location. The computer determines whether the distance between the current location and the target location is greater than a distance threshold.

In response to determining that the distance between the current location and the target location is greater than the distance threshold, the computer performs a far distance process configured to determine and display a first target view of the target location where the distance is greater than a distance threshold. In response to determining that the distance between the current location and the target location is not greater than the distance threshold, the computer performs a near distance process configured to determine and display a second target view of the target location where the distance is not greater than a distance threshold.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a flow diagram illustrating a method for determining a target view for a far distance, in accordance with some embodiments;

DETAILED DESCRIPTION

The following detailed description is directed to technologies for providing an improved view of a location in a spatial environment, in accordance with some embodiments. In accordance with some embodiments described herein, a map application may display a current image, which provides a view of a current location of a geographic area. Through an interface in the map application, a user may select a point on the current image in order to navigate to a target location corresponding to the user-selected point. The map application may then determine whether a particular target image that provides a desirable view of the target location is available. In particular, the map application may analyze a number of different factors including distance and/or angle. If the target image is available, then the map application may transition from displaying the current image to displaying the target image. If the target image is not available, then the map application may perform a feedback event, such as a zoom operation, on the current image.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
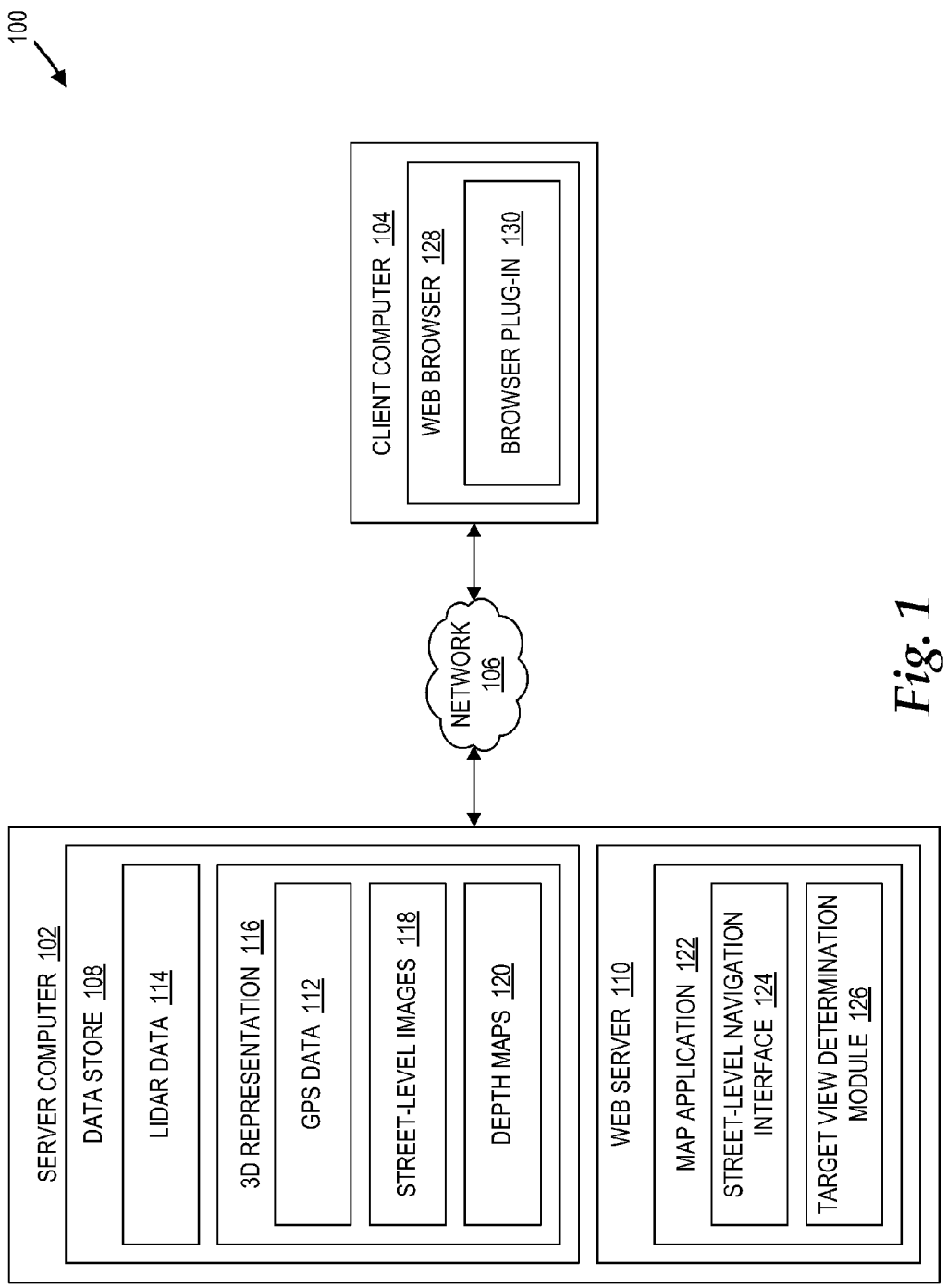
FIG. 1 shows a network architecture diagram illustrating a network architecture configured to provide web-based map services, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing an improved view of a location in a spatial environment will be described. In particular, FIG. 1 illustrates an example computer network architecture 100 configured to provide a web-based map service, in accordance with some embodiments. The computer network architecture 100 includes a server computer 102 and a client computer 104 coupled via a network 106. The network 106 may be any suitable computer network, such as a local area network ("LAN"), a personal area network ("PAN"), or the Internet.

The server computer 102 includes data store 108 and a web server 110. The data store 108 includes Light Detection and Ranging ("LIDAR") data 114 and a 3D representation 116 of a geographic area. The 3D representation includes Global Positioning System ("GPS") data 112, street-level images 118 and depth maps 120. The web server 110 includes a map application 122. The map application 122 includes a street-level navigation interface 124 and a target view determination module 126. The client computer 104 includes a web browser 128. A browser plug-in 130 is installed on the web browser 128.

The street-level images 118 may include street-level photographs taken by multiple cameras attached to a moving vehicle. As the vehicle moves, the multiple cameras may be configured to take multiple photographs in multiple directions at various locations and/or at specified intervals. Suitable image processing techniques can then stitch together the multiple photographs corresponding to each location in order to generate 360 degree panoramic views of each location and to provide smooth transitions between the street-level images 118. The locations may be identified using the GPS data 112.

Additional processing may be performed on the street-level images 118 to reduce the size of the files and/or to remove private information (e.g., blur or remove faces or license plate numbers).

According to some embodiments, each of the street-level images 118 may be associated with a view of a target location in a geographic area. For example, a given street-level image may provide a view of the 100 block of Main Street in a metropolitan city. This view may be associated with orientation information, which can be utilized to categorize, process, and/or analyze the corresponding street-level image. Examples of orientation information may include compass direction (e.g., north, south, east, west, etc.), latitude, longitude, altitude, heading (e.g., direction that the vehicle is facing when taking pictures), roll (e.g., whether the vehicle is titled left or right), and/or pitch (e.g., whether the vehicle is tilted up or down).

The LIDAR data 114 may be generated by analyzing characteristics of reflected laser light. At each location, a laser emitting device (not shown) may emit laser light in multiple directions. A laser detection device (not shown) may receive the reflected laser light that reflects off structures (e.g., buildings, trees, cars, etc.) in the geographic area. Suitable LIDAR processing techniques can then generate the LIDAR data 114 based on the reflected laser light. Additional LIDAR processing techniques can also generate the depth maps 120 based on the LIDAR data 114. The depth maps 120 may identify depth information at multiple points (e.g., objects, portions of objects, etc.) within each geographic area. In some embodiments, the depth maps 120 may be simplified to remove inconsequential details. For example, while data indicating the presence of a building may be useful for purposes of street-level navigation, data about the depth of individual windows, doors, and ornamental designs on the building may not be useful.

Suitable 3D processing techniques may generate the 3D representation 116 of the geographic area by mapping multiple points in the street-level images 118 to corresponding points on the depth maps 120. In this way, the two-dimensional ("2D") street-level images 118 may be associated with depth information from the depth maps 120, thereby forming the 3D representation 116. It should be appreciated that the previously described process for generating the 3D representation 116 is merely an example and other suitable techniques for generating the 3D representation 116 may be similarly utilized. These other techniques may utilize some combination of optical data acquisition/processing, acoustic data acquisition/processing, laser scanning data acquisition/processing, radar data acquisition/processing, thermal data acquisition/processing, and/or seismic data acquisition/processing.

The map application 122 may be a web-based map application that provides map-based services over the network 106 or a software-based map application that is installed directly on the client computer 104. In the case where the map application 122 is a web-based map application, a user on the client computer 104 may access the map application 122 utilizing the web browser 128. In some embodiments, the web browser 128 may natively interpret the map application 122. In other embodiments, the map application 122 may be a Rich Internet Application ("RIA") that can be interpreted by the web browser 128 utilizing the browser plug-in 130. Examples of the browser plug-in 130 may include MICROSOFT SILVERLIGHT from MICROSOFT CORPORATION and ADOBE FLASH from ADOBE SYSTEMS INCORPORATED.

The map application 122 may be configured to provide a user experience that simulates the user actually walking or driving through the streets of geographic locations. To this end, the map application 122 may provide access to the 3D representation 116. For example, the map application 122 may display one or more of the street-level images 118 contained in the 3D representation 116. As the user navigates within the 3D representation 116 the map application 122 may transition to displaying at least another one of the street-level images 118.

The map application 122 may provide the street-level navigation interface 124 that enables the user to navigate the 3D representation 116. The street-level navigation interface 124 may provide various navigation functionality, including functionality for moving directionally (e.g., forward, back, left, right) within the 3D representation 116, tilting a view, and/or zooming in and out of the view. The street-level navigation interface 124 may also provide functionality enabling a user to simply click (e.g., using a mouse or other pointing device) on a location in the 3D representation 116 to select the location. By selecting the location, the user may signal a request for an improved view of the selected location. As a result, the target view determination module 126 then selects one of the street-level images 118 that corresponds to a target view of the selected location. The operation of the target view determination module 126 is described in greater detail below with reference to FIGS. 2, 3, 4A, 4B, and 4C.

Figure 2:
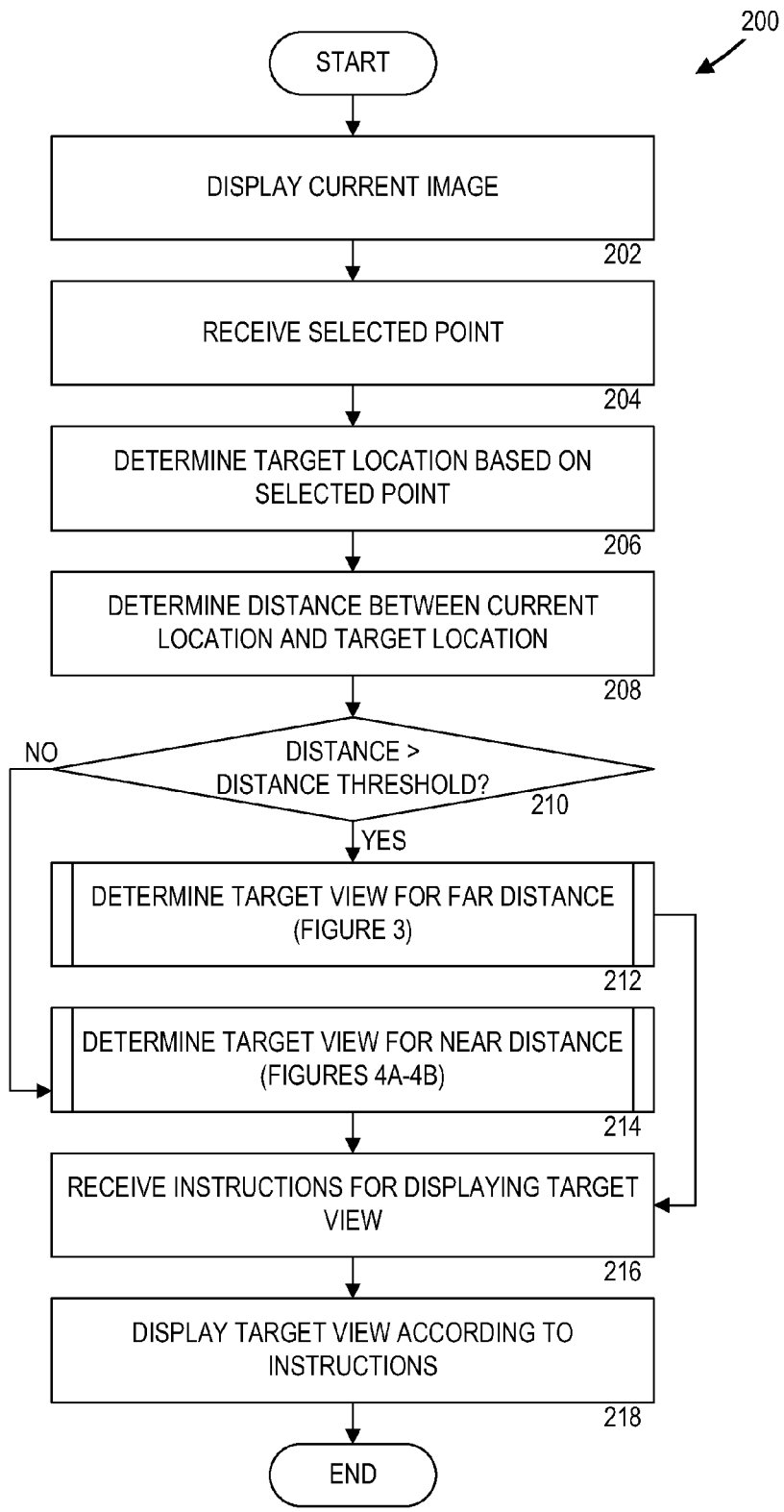
FIG. 2 shows a flow diagram illustrating a method for determining a target view of a selected location in a three-dimensional environment, in accordance with some embodiments.
Figure 4A:
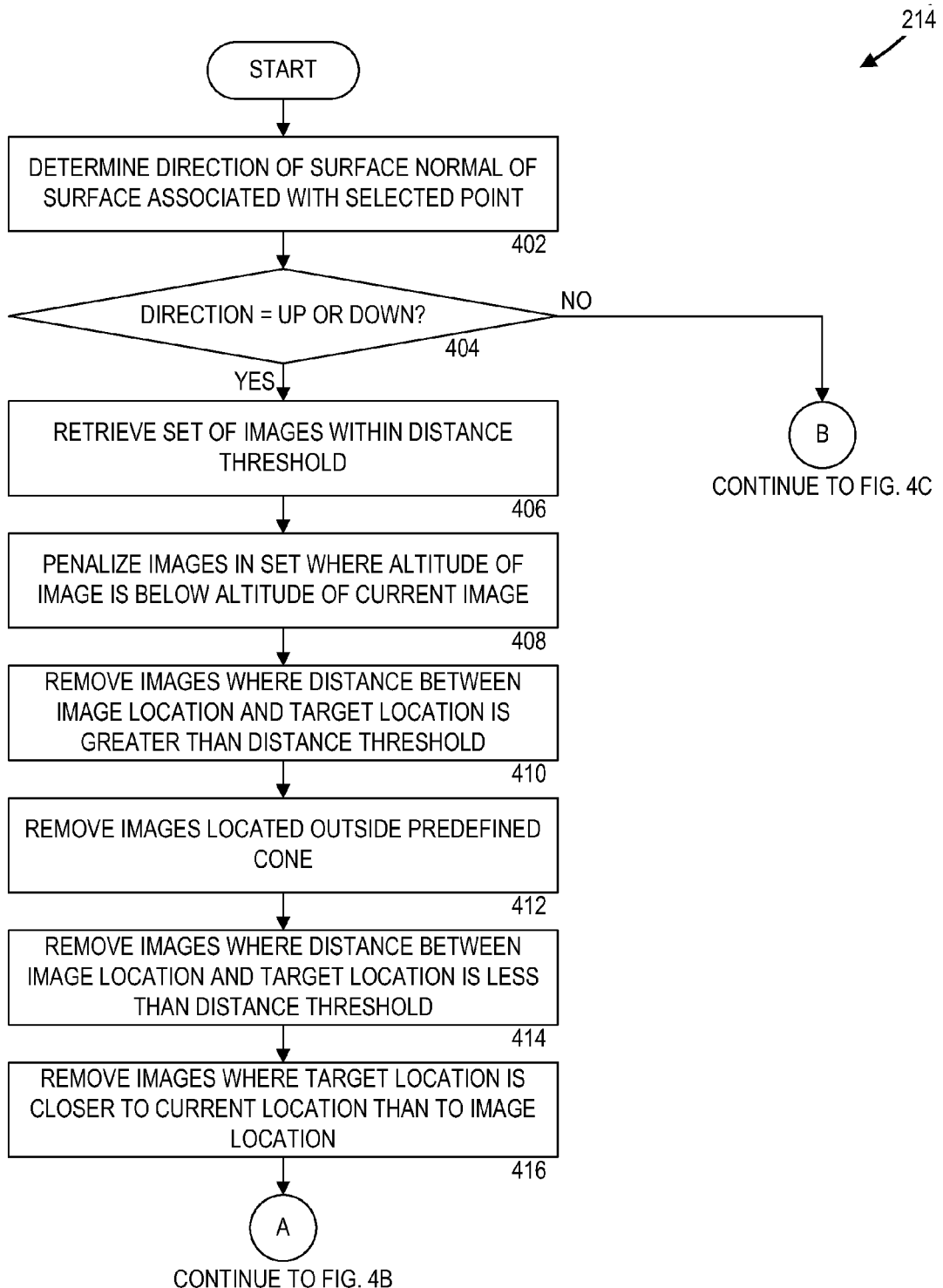
FIGS. 4A, 4B, and 4C show a flow diagram illustrating a method for determining a target view for a near distance, in accordance with some embodiments.
Figure 4B:
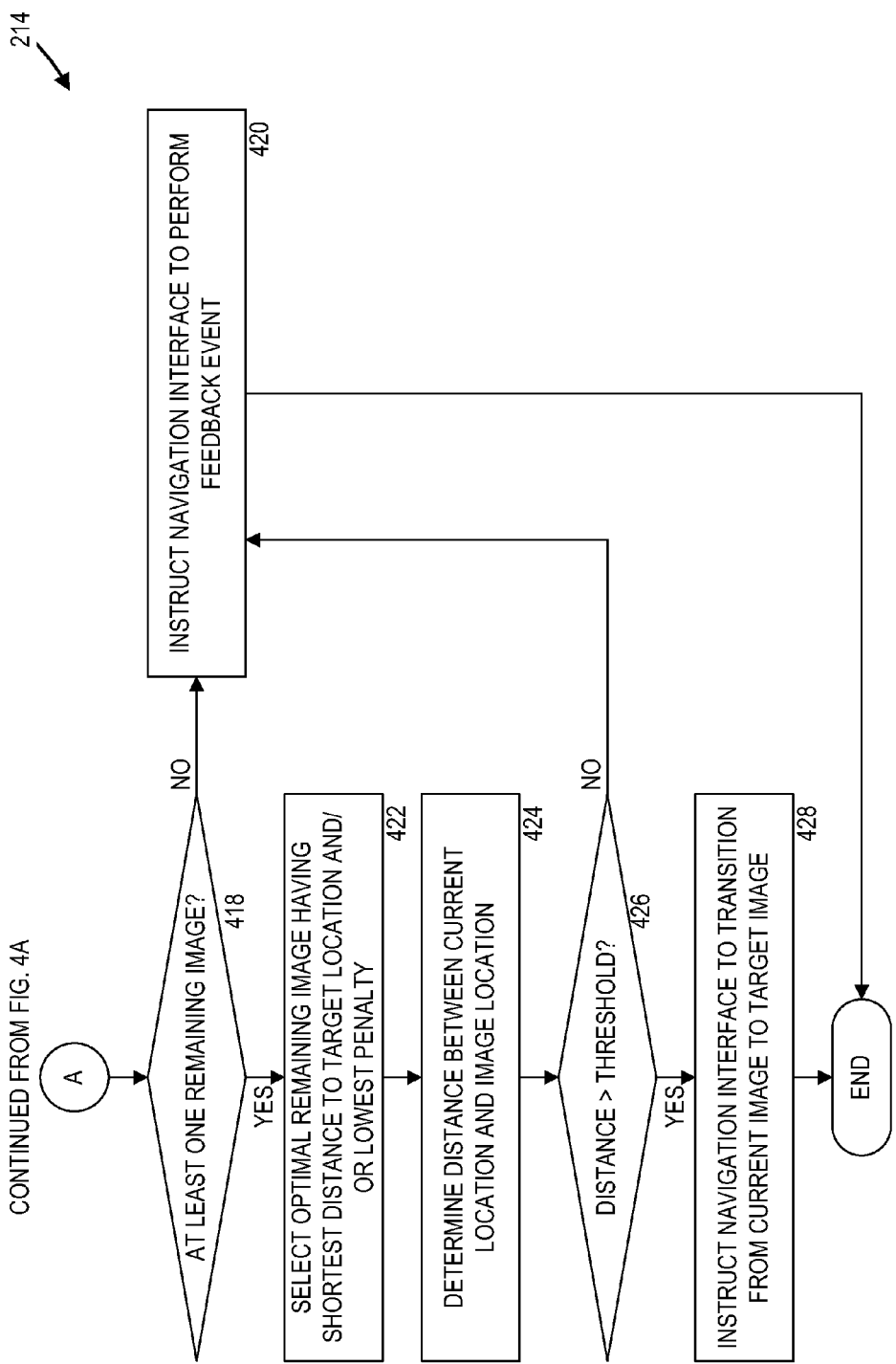
Figure 4C:
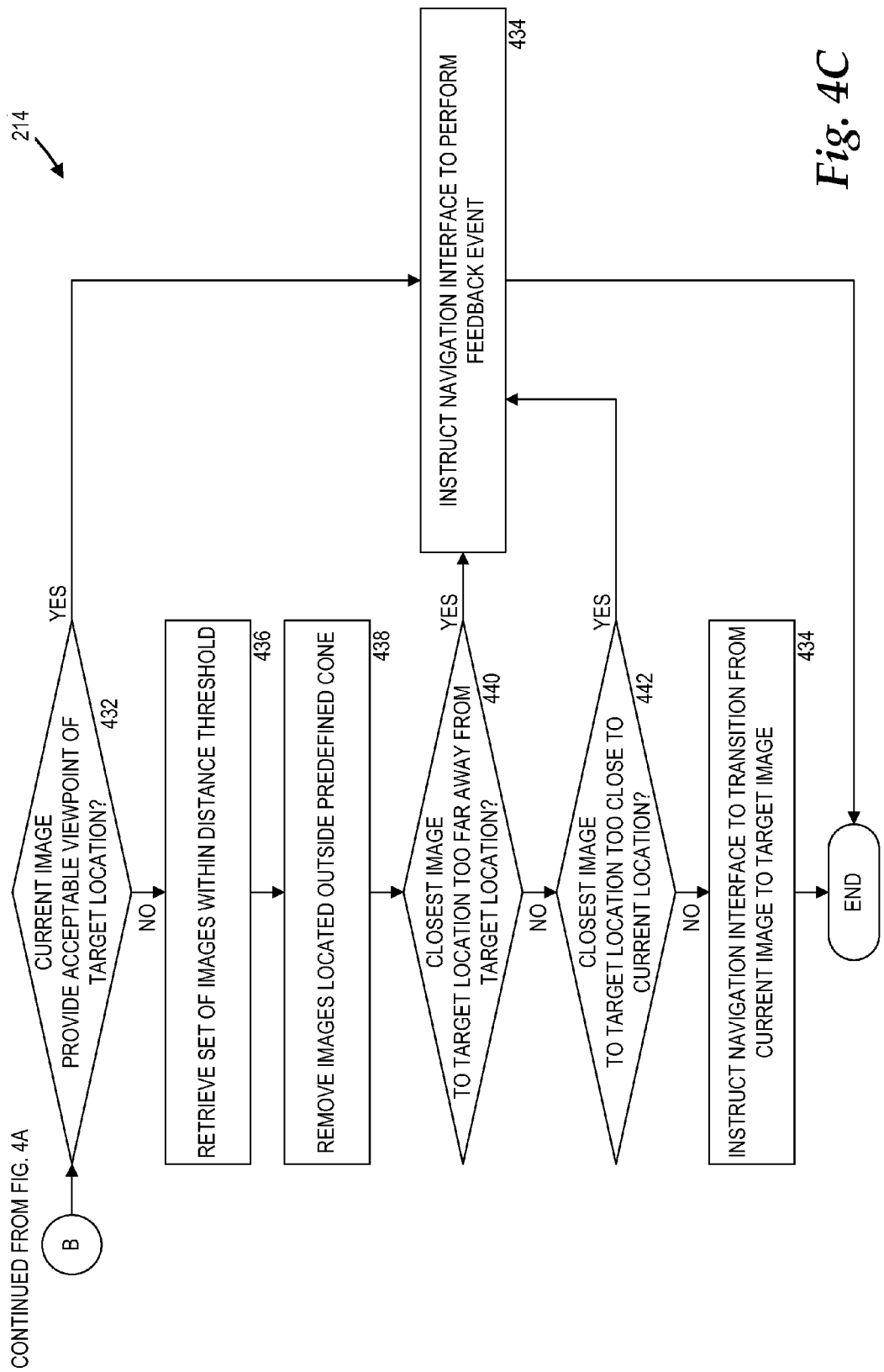

Referring now to FIGS. 2, 3, 4A, 4B, and 4C, additional details regarding the operation of the map application 122, including the street-level navigation interface 124 and the target view determination module 126, will be described. In particular, FIG. 2 shows a flow diagram illustrating a method for determining a target view of a selected location in a three-dimensional environment, in accordance with some embodiments. FIG. 3 shows a flow diagram illustrating a method for determining a target view for a far distance, in accordance with some embodiments. FIGS. 4A, 4B, and 4C show a flow diagram illustrating a method for determining a target view for a near distance, in accordance with some embodiments.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the street-level navigation interface 124 displays a current image from the street-level images 118 in the 3D representation 116. The current image may provide a view of a current location in the geographic area represented by the 3D representation 116. Upon viewing the current image, the user can navigate within the 3D representation 116. In one embodiment, the user can navigate to a target location in the geographic area represented by the 3D representation 116 by selecting (e.g., clicking), using a suitable pointing device (e.g., a mouse), on a point corresponding to the target location in the current image. In other embodiments, the user merely hovers a cursor over a particular location without selecting the location. In such cases, the street-level navigation interface 124 can preview the projected target view. When the street-level navigation interface 124 displays the current image from the street-level images 118 in the 3D representation 116, the routine 200 proceeds to operation 204.

At operation 204, the street-level navigation interface 124 receives the user-selected point that is selected by the user using the pointing device. The routine 200 then proceeds to operation 206, where the target view determination module 126 determines the target location in the geographic area based on the selected point. For example, the target view determination module 126 may intersect the selected point on the current image with the target location in the geographic area based on information provided by the GPS data 112 and the depth maps 120. When the target view determination module 126 determines the target location in the geographic area based on the selected point, the routine 200 proceeds to operation 208.

At operation 208, the target view determination module 126 determines a distance between the current location and the target location. For example, the target view determination module 126 may determine the distance between the current location and the target location based on information provided by the GPS data 112 and the depth maps 120. The routine 200 then proceeds to operation 208, where the target view determination module 126 determines whether the distance between the current location and the target location is greater than a first distance threshold. In one embodiment, the first distance threshold is about 190 meters, which is approximately the distance where LIDAR data becomes less reliable.

If the target view determination module 126 determines that the distance between the current location and the target location is greater than the first distance threshold, then the routine 200 proceeds to a routine 212, where the target view determination module 126 performs a method for determining a target view for a far distance (i.e., a distance greater than the first distance threshold). The method for determining a target view for a far distance is described in greater detail below with reference to FIG. 3. If the target view determination module 126 determines that the distance between the current location and the target location is not greater than the first distance threshold, then the routine 200 proceeds to a routine 214, where the target view determination module 126 performs a method for determining a target view for a near distance (i.e., a distance less than the first distance threshold). The method for determining a target view for a near distance is described in greater detail below with reference to FIGS. 4A, 4B, and 4C. When the target view determination module 126 performs the method for determining the target view for a far distance or a near distance, the routine 200 proceeds to operation 216.

At operation 216, the street-level navigation interface 124 receives, from the target view determination module 126, instructions for displaying the target view. The routine 200 then proceeds to operation 218, where the street-level navigation interface 124 displays the target view according to the instructions from the target view determination module 126. In some embodiments, the target view may be a new image selected from the street-level images 118. If the target view is a new image, then the street-level navigation interface 124 transitions from displaying the current image to displaying the new image. In other embodiments, the target view may be the current image. In such cases, the target view may include a feedback event, such as a zoom operation. In this way, the user is provided some indication acknowledging that the street-level navigation interface 124 received the selected point. When the street-level navigation interface 124 displays the target view according to the instructions received from the target view determination module 126, the routine 200 ends.

In FIG. 3, the routine 212 begins at operation 302, where the target view determination module 126 determines an angle difference relative to the sky or the ground between the current location associated with the current image and the target location associated with the selected point. The angle difference may indicate that the user has selected a point that is either too high in the sky or too low to the ground. In either case, transitioning from displaying the current image to displaying a new image of the sky or the ground may provide a poor user experience. When the target view determination module 126 determines an angle difference relative to the sky or the ground between the current location associated with the current image and the target location associated with the selected point, the routine 212 proceeds to operation 304.

At operation 304, the target view determination module 126 determines whether angle difference is greater than an angle threshold. In one embodiment, the angle threshold is about 25 degrees. If the angle difference is greater than the angle threshold, then the routine 212 proceeds to operation 306, where the target view determination module 126 instructs the street-level navigation interface 124 to perform a feedback event. In one embodiment, the feedback event is a zoom operation where the street-level navigation interface 124 zooms in within the current image. The zoom operation may be implemented by decreasing the field of view of the current image. When the target view determination module 126 instructs the street-level navigation interface 124 to perform a feedback event, the routine 212 ends.

If the angle difference is not greater than the angle threshold, then the routine 212 proceeds to operation 308, where the target view determination module 126 identifies an image in the street-level images 118 that is nearest to a move far distance from the target location and within a first cone between the current location and the target location. For example, the current location may be positioned at the point of the first cone, and the target location may be positioned in the center of the first cone. In one embodiment, the move far distance is about 80 meters and the first cone is about 20 degrees. Additional details regarding cones will be described in greater detail below with respect to FIG. 5. When the target view determination module 126 identifies an image in the street-level images 118 that is nearest to a move far distance from the target location and within a first cone between the current location and the target location, the routine 212 proceeds to operation 310.

At operation 310, the target view determination module 126 determines whether the identified nearest image is the same as the current image. If the target view determination module 126 determines that the identified nearest image is the same as the current image, then the routine 212 proceeds to operation 306, where the target view determination module 126 instructs the street-level navigation interface 124 to perform a feedback event. If the target view determination module 126 determines that the identified nearest image is not the same as the current image, then the routine 212 proceeds to operation 312, where the target view determination module 126 instructs the street-level navigation interface 124 to transition from displaying the current image to displaying the identified nearest image. When the target view determination module 126 instructs the street-level navigation interface 124 to transition from displaying the current image to displaying the identified nearest image, the routine 212 ends.

In FIG. 4A, the routine 214 begins at operation 402, where the target view determination module 126 determines the direction of a surface normal (i.e., a perpendicular vector) of a surface associated with the user-selected point. In one example, if the selected point is on a road, the surface normal may point up to the sky. In another example, if the selected point is on the underside of an overpass, the surface normal may point down to the ground. In yet another example, if the selected point is on the side of a building, the surface normal may point horizontally. When the target view determination module 126 determines the direction of the surface normal of the surface associated with the selected point, the routine 214 proceeds to operation 404.

At operation 404, the target view determination module 126 determines whether surface normal points up in the direction of the sky or down in the direction of the ground within a predefined tolerance. In one embodiment, the predefined tolerance is about 30 degrees. If the target view determination module 126 determines that the surface normal does not point up in the direction of the sky or down in the direction of the ground within the predefined tolerance, then the routine 214 proceeds to operation 432 in FIG. 4C, which is described below. If the target view determination module 126 determines that the surface normal points up in the direction of the sky or down in the direction of the ground within the predefined tolerance, then the routine 214 proceeds to operation 406, where the target view determination module 126 retrieves a set of candidate images having views of corresponding candidate image locations that are within a second distance threshold from the target location. In one embodiment, the second distance threshold is about 200 meters. When the target view determination module 126 retrieves the set of candidate images having views of corresponding candidate image locations that are within the second distance threshold from the target location, the routine 214 proceeds to operation 408.

At operation 408, the target view determination module 126 penalizes (or removes) any candidate images from the set of candidate images where the altitudes of the corresponding candidate image locations are below the altitude of the current image. For example, if the current image shows a view above an overpass, the target view determination module 126 may penalize (or remove) images that show a view below the overpass. When the target view determination module 126 penalizes (or removes) any candidate images from the set of candidate images where the altitudes of the corresponding candidate image locations are below the altitude of the current image, the routine 214 proceeds to operation 410.

At operation 410, the target view determination module 126 removes (or penalizes) any candidate images from the set of candidate images where the distances between the corresponding candidate image locations and the target location are greater than a third distance threshold. In one embodiment, the third distance threshold is about 12 meters. The routine 214 then proceeds to operation 412, where the target view determination module 126 removes (or penalizes) any candidate images from the set of candidate images having corresponding candidate image locations that fall outside of a second cone between the current location and the target location. For example, the current location may be positioned at the point of the second cone, and the target location may be positioned in the center of the second cone. In one embodiment, the second cone is about 60 degrees. Additional details regarding cones will be described in greater detail below with respect to FIG. 5. When the target view determination module 126 removes (or penalizes) any candidate images from the set of candidate images having corresponding candidate image locations that fall outside of a second cone between the current location and the target location, the routine 214 proceeds to operation 414.

At operation 414, the target view determination module 126 removes (or penalizes) any candidate images from the set of candidate images where the distances between corresponding candidate image locations and the target location are less than a fourth distance threshold. In one embodiment, the fourth distance threshold is about 1 meter. In this way, the target view determination module 126 can eliminate images that are too close to the target location. The routine 214 then proceeds to operation 416, where the target view determination module 126 removes (or penalizes) any candidate images from the set of candidate images where the target location is closer to the current location than to the corresponding candidate image locations. When the target view determination module 126 removes (or penalizes) any candidate images from the set of candidate images where the target location is closer to the current location than to the corresponding candidate image locations, the routine 214 proceeds to operation 418 in FIG. 4B.

At operation 418 in FIG. 4B, the target view determination module 126 determines whether the set of remaining candidate images contains at least one candidate image. If the target view determination module 126 determines that the set of remaining candidate images does not contain at least one candidate image, then the routine 214 proceeds to operation 420, where the target view determination module 126 instructs the street-level navigation interface 124 to perform a feedback event. If the target view determination module 126 determines that the set of remaining candidate images contains at least one candidate image, then the routine 214 proceeds to operation 422, where the target view determination module 126 selects a target image from the set of remaining candidate images. The target image may be the remaining candidate image having a corresponding candidate image location that is the shortest distance to the target location and/or having the lowest penalty. When the target view determination module 126 selects a target image from the set of remaining candidate images, the routine 214 proceeds to operation 424.

At operation 424, the target view determination module 126 determines a distance between the corresponding candidate image location of the target image and the current location. The routine 214 then proceeds to operation 426, where the target view determination module 126 determines whether the distance between the corresponding candidate image location of the target image and the current location is greater than a fifth distance threshold. If the distance between the corresponding candidate image location of the target image and the current location is not greater than a fifth distance threshold, then the routine 214 proceeds to operation 420, where the target view determination module 126 instructs the street-level navigation interface 124 to perform a feedback event. If the distance between the corresponding candidate image location of the target image and the current location is greater than the fifth distance threshold, then the routine 214 proceeds to operation 428, where the target view determination module 126 instructs the street-level navigation interface 124 to transition from displaying the current image to displaying the target image. When the target view determination module 126 instructs the street-level navigation interface 124 to transition from displaying the current image to displaying the target image, the routine 214 ends.

It should be appreciated the criteria described herein for penalizing and/or removing candidate images from the set of candidate images are merely examples. Other suitable criteria for penalizing and/or removing candidate images from the set of candidate images may be similarly utilized.

At operation 432 at FIG. 4C, the target view determination module 126 determines whether the current image provides an acceptable viewpoint of the target location. For example, if the current location is within a specified distance (e.g., 12 meters) and/or a specified cone (e.g., 62 degrees) from the surface normal, then the target view determination module 126 may determine that the current location provides an acceptable viewpoint of the target location. If the target view determination module 126 determines that the current image does not provide an acceptable viewpoint of the target location, then the routine 214 proceeds to operation 434, where the target view determination module 126 instructs the street-level navigation interface 124 to perform a feedback event. If the target view determination module 126 determines that the current image provides an acceptable viewpoint of the target location, then the routine 214 proceeds to operation 436.

At operation 436, the target view determination module 126 retrieves a set of candidate images having views of corresponding candidate image locations that are within a given distance threshold from the target location. The routine 214 then proceeds to operation 438, where the target view determination module 126 removes any candidate images from the set of candidate images having corresponding candidate image locations that fall outside of a given cone between the current location and the target location. When the target view determination module 126 removes any candidate images from the set of candidate images having corresponding candidate image locations that fall outside of a given cone between the current location and the target location, the routine 214 proceeds to operation 440.

At operation 440, the target view determination module 126 selects, from the remaining candidate images, a target image having a corresponding target image location that is closest to the target location and determines whether the target image location is too far away from the target location. In particular, the target view determination module 126 may determine whether the distance between the target image location and the target location is greater than a given distance threshold. If the target view determination module 126 determines that the distance between the target image location and the target location is greater than a given distance threshold, then the routine 214 proceeds to operation 434, where the target view determination module 126 instructs the street-level navigation interface 124 to perform a feedback event. If the target view determination module 126 determines that the distance between the target image location and the target location is not greater than a given distance threshold, then the routine 214 proceeds to operation 442.

At operation 442, the target view determination module 126 determines whether the target image location is too close to the target location. In particular, the target view determination module 126 may determine whether the distance between the target image location and the target location is less than a given distance threshold. If the target view determination module 126 determines that the distance between the target image location and the target location is less than a given distance threshold, then the routine 214 proceeds to operation 434, where the target view determination module 126 instructs the street-level navigation interface 124 to perform a feedback event. If the target view determination module 126 determines that the distance between the target image location and the target location is not less than a given distance threshold, then the routine 214 proceeds to operation 444, where the target view determination module 126 instructs the street-level navigation interface 124 to transition from displaying the current image to displaying the target image. When the target view determination module 126 instructs the street-level navigation interface 124 to transition from displaying the current image to displaying the target image, the routine 214 ends.

Figure 5:
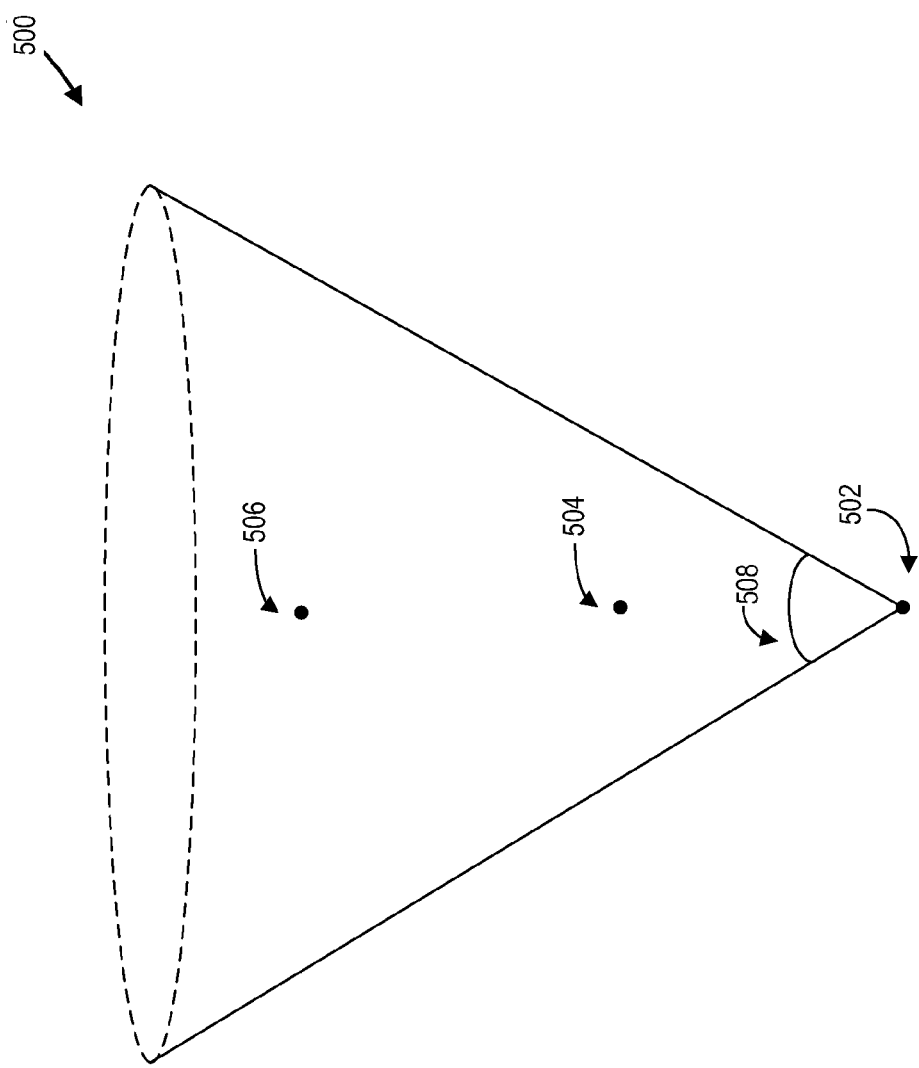
FIG. 5 shows a predefined cone, in accordance with some embodiments.

Referring now to FIG. 5, additional details regarding predefined cones, such as the first cone and the second cone described above, will be provided. In particular, FIG. 5 shows a diagram illustrating a predefined cone 500 between a current location 502, a first target location 504, and a second target location 506. The target locations 504, 506 may be positioned in the center of the cone. The predefined cone 500 has an angle 508.

According to embodiments, the predefined cone 500 defines a tolerance level for selecting images near the target locations 504, 506. That is, if the target locations 504, 506 are positioned nearer to the current location 502, then the tolerance level decreases because the predefined cone 500 becomes narrower. If the target locations 504, 506 are positioned farther from the current location 502, then the tolerance level increases because the predefined cone 500 becomes wider. For example, the width of the cone at the first target location 504 is narrower than the width of the predefined cone 500 at the second target location 506. The tolerance level may be controlled adjusting the angle 508. In some embodiments, target locations that are slightly outside the predefined cone 500 may be acceptable.

Figure 6A:
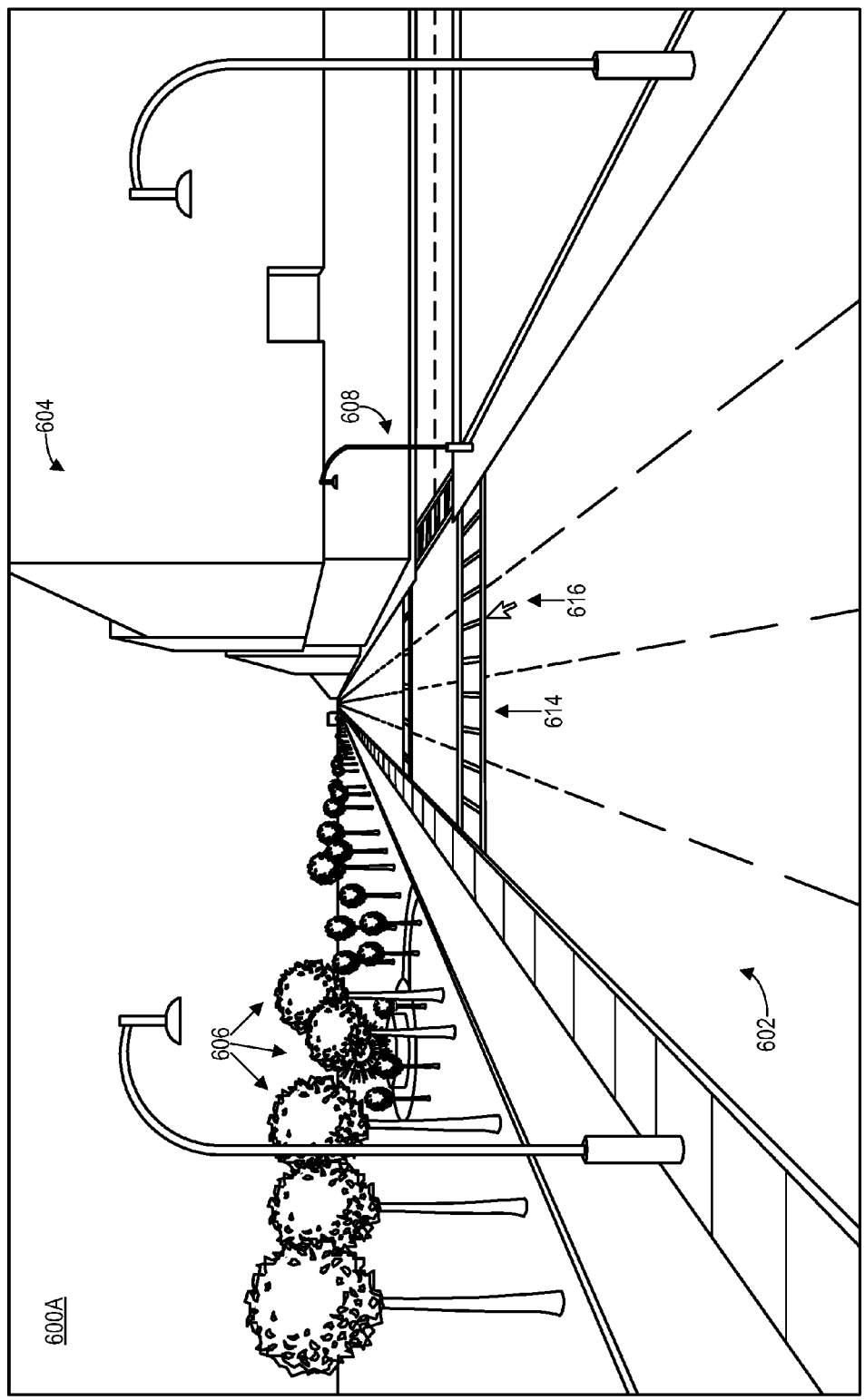
FIG. 6A shows a screen display diagram illustrating a current image from the street-level images, in accordance with some embodiments.
Figure 6B:
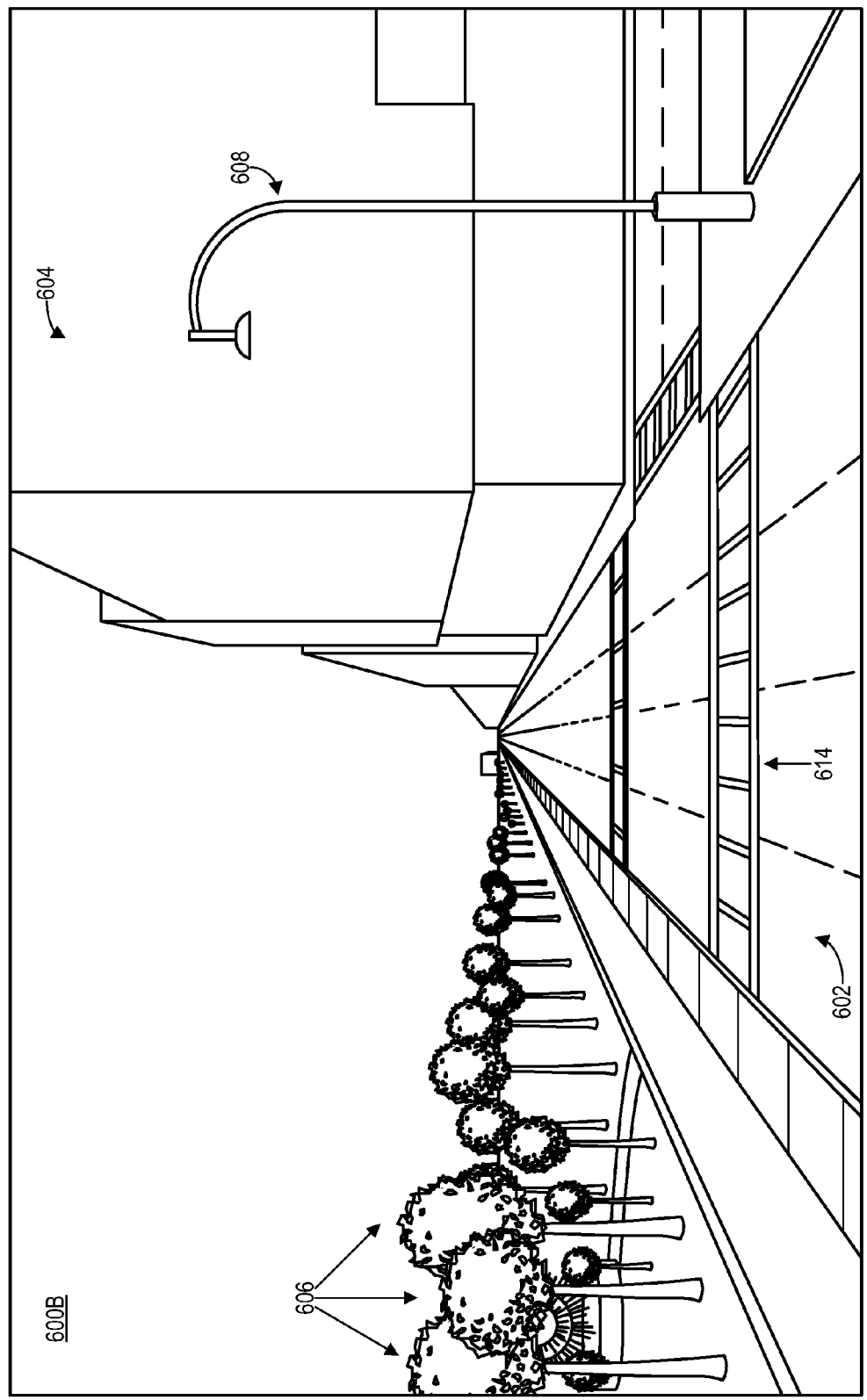
FIG. 6B shows a screen display diagram illustrating a target image from the street-level images, in accordance with some embodiments.

Referring now to FIGS. 6A and 6B, additional details regarding the operation of the street-level navigation interface 124 and the target view determination module 126 will be described. In particular, FIG. 6A shows a screen display diagram illustrating a current image 600A from the street-level images 118, in accordance with some embodiments. The current image 600A provides a first view of a geographic location. The current image 600A includes a road 602, a building 604, some trees 606, and a light post 608. Although the current image 600A is a two-dimensional image, the depth maps 120 may provide depth information to yield the 3D representation 116. For example, as the road 602 narrows from the bottom of the current image 600A to the middle of the current image 600A, the associated depth information may change.

Along the road 602 is a crosswalk 614. In an illustrative example, a user clicks on the crosswalk 614 as indicated by a cursor 616. When the user clicks on the crosswalk 614, the target view determination module 126 determines a target image 600B, as illustrated in FIG. 6B, and instructs the street-level navigation interface 124 to transition from the current image 600A to the target image 600B. In particular, FIG. 6B shows a screen displaying diagram illustrating the target image 600B from the street-level images 118, in accordance with some embodiments. As illustrated in FIG. 6B, when the user clicks on the crosswalk 614, the user requests an improved view of the crosswalk 614. In response to the user's request, the street-level navigation interface 124 transitions from the current image 600A to the target image 600B.

Referring again to FIG. 6A, in some other embodiments, a user can merely hover the cursor 616 over the crosswalk 614 without clicking on the crosswalk 614. When the user hovers the cursor 616 over the crosswalk 614, the cursor 616 may provide feedback indicating the transition and/or information about the transition, thereby previewing an occurrence if the user clicks on the crosswalk 614. For example, the cursor 616 may change shape, size, and/or color to indicate a certain type of transition.

Figure 7:
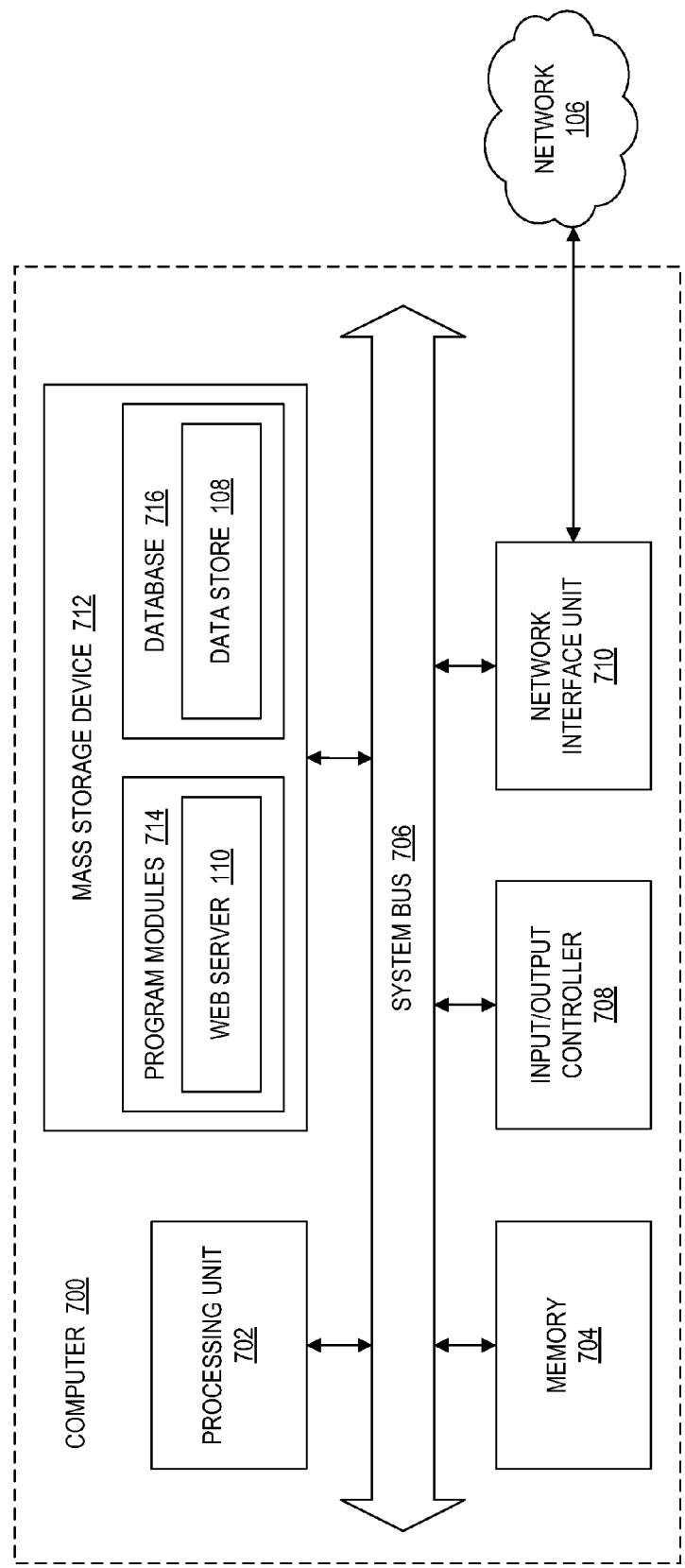
FIG. 7 is a computer architecture diagram showing an illustrative computer hardware architecture for a computing system capable of implementing the embodiments presented herein.

Turning now to FIG. 7, an example computer architecture diagram showing a computer 700 is illustrated. Examples of the computer 700 may include the server computer 102 and the client computer 104. The computer 700 may include a central processing unit ("CPU") 702, a system memory 704, and a system bus 706 that couples the memory 704 to the CPU 702. The computer 700 may further include a mass storage device 712 for storing one or more program modules 714 and a database 716. Examples of the program modules 714 may include the web server 110 and the web browser 128. An example of the database 716 may be the data store 108. MAP The mass storage device 712 may be connected to the CPU 702 through a mass storage controller (not shown) connected to the bus 706. The mass storage device 712 and its associated computer-storage media may provide non-volatile storage for the computer 700. Although the description of computer-storage media contained herein refers to a mass storage device, such as a hard disk or CD-ROM drive, it should be appreciated by those skilled in the art that computer-storage media can be any available computer storage media that can be accessed by the computer 700.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 106. The computer 700 may connect to the network 106 through a network interface unit 710 connected to the bus 706. It should be appreciated that the network interface unit 710 may also be utilized to connect to other types of networks and remote computer systems. The computer 700 may also include an input/output controller 708 for receiving and processing input from a number of input devices (not shown), including a keyboard, a mouse, a microphone, and a game controller. Similarly, the input/output controller 708 may provide output to a display or other type of output device (not shown).

The bus 706 may enable the processing unit 702 to read code and/or data to/from the mass storage device 712 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 714 may include software instructions that, when loaded into the processing unit 702 and executed, cause the computer 700 to provide an improved view of a location in a spatial environment. The program modules 714 may also provide various tools or techniques by which the computer 700 may participate within the overall systems or operating environments using the components, flows, and data structures discussed throughout this description. For example, the program modules 714 may implement interfaces for providing an improved view of a location in a spatial environment.

In general, the program modules 714 may, when loaded into the processing unit 702 and executed, transform the processing unit 702 and the overall computer 700 from a general-purpose computing system into a special-purpose computing system customized to provide an improved view of a location in a spatial environment. The processing unit 702 may be constructed from any number of transistors or other discrete circuit elements, which may individually or collectively assume any number of states. More specifically, the processing unit 702 may operate as a finite-state machine, in response to executable instructions contained within the program modules 714. These computer-executable instructions may transform the processing unit 702 by specifying how the processing unit 702 transitions between states, thereby transforming the transistors or other discrete hardware elements constituting the processing unit 702.

Encoding the program modules 714 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 714 may transform the physical state of the semiconductor memory, when the software is encoded therein. For example, the program modules 714 may transform the state of transistors, capacitors, or other discrete circuit elements constituting the semiconductor memory.

As another example, the computer-storage media may be implemented using magnetic or optical technology. In such implementations, the program modules 714 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing an improved view of a location in a spatial environment are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing an improved view of a location in a spatial environment, the method comprising computer-implemented operations for:
    displaying, through a computer having a memory and a processor, a current image associated with a current location of a geographic area;
    receiving, through the computer, a user-selected point on the current image;
    determining, through the computer, a target location of the geographic area based on the user-selected point;
    determining, through the computer, a distance between the current location and the target location;
    determining, through the computer, whether the distance between the current location and the target location is greater than a distance threshold;
    in response to determining that the distance between the current location and the target location is greater than the distance threshold, performing, through the computer, a far distance process configured to determine and display a first target view of the target location where the distance is greater than the distance threshold; and
    in response to determining that the distance between the current location and the target location is not greater than the distance threshold, performing, through the computer, a near distance process configured to determine and display a second target view of the target location where the distance is not greater than the distance threshold by
        retrieving, through the computer, a set of candidate images within a second distance threshold from the target location,
        penalizing and removing, through the computer, one or more candidate from the set of candidate images according to criteria,
        determining, through the computer, whether the set of candidate images contains at least one candidate image,
        in response to determining that the set of candidate images does not contain at least one candidate image, performing, through the computer, a feedback event,
        in response to determining that the set of candidate images contains at least one candidate image, selecting, through the computer, a target image from the set of candidate images having a lowest penalty and where a corresponding image location is a shortest distance to the target location, and
        transitioning, through the computer, from displaying the current image to displaying the target image.

2. The computer-implemented method of claim 1, wherein the current image comprises a three-dimensional representation of the current location, the three-dimensional representation comprising a street-level photograph of the current location, global positioning system (GPS) data identifying the current location, and depth information identifying depths of objects in the street-level photograph.

3. The computer-implemented method of claim 2, wherein the depth information is generated based on light detection and ranging (LIDAR) data.

4. The computer-implemented method of claim 2, wherein determining, through the computer, a target location of the geographic area based on the user-selected point comprises computer implemented operations for determining, through the computer, the target location of the geographic area by intersecting the user-selected point with the GPS data and the depth information.

5. The computer-implemented method of claim 1, wherein performing, through the computer, a far distance process configured to determine and display a first target view of the target location where the distance is greater than the distance threshold comprises computer-implemented operations for:
retrieving, through the computer, a target image having a corresponding image location that is a shortest distance to the target location and is within a cone between the current location and the target location;
upon retrieving the target image, determining, through the computer, whether the target image is the current image;
in response to determining that the target image is the current image, performing, through the computer, a feedback event; and
in response to determining that the target image is not the current image, transitioning, through the computer, from displaying the current image to displaying the target image.

6. The computer-implemented method of claim 5, wherein performing, through the computer, the feedback event comprises performing a zoom operation on the current image.

7. The computer-implemented method of claim 5, wherein the method further comprises computer-implemented operations for:
determining, through the computer, an angle difference between the current location and the target location;
determining, through the computer, whether the angle difference is greater than an angle threshold;
in response to determining that the angle difference is greater than the angle threshold, performing, through the computer, the feedback event; and
wherein retrieving, through the computer, the target image comprises in response to determining that the angle difference is not greater than the angle threshold, retrieving, through the computer, the target image from a plurality of images.

8. The computer-implemented method of claim 1, further comprising the steps of:
determining, through the computer, a distance between the current location and the corresponding image location of the target image;
determining, through the computer, whether the distance between the current location and the corresponding image location of the target image is greater than another distance threshold;
in response to determining that the distance between the current location and the corresponding image location of the target image is greater than the another distance threshold, performing, through the computer, the feedback event; and
in response to determining that the distance between the current location and the corresponding image location of the target image is not greater than the another distance threshold, transitioning, through the computer, from displaying the current image to displaying the target image.

9. The computer-implemented method of claim 1, wherein penalizing and removing, through the computer, one or more candidate images from the set of candidate images according to criteria comprises computer-implemented operations for:
for each candidate image in the set of candidate images, penalizing, through the computer, the candidate image where an altitude of a corresponding image location is below an altitude of the current image;
for each candidate image in the set of candidate images, removing, through the computer, the candidate image from the set of candidate images where a distance between the corresponding image location and the target location is greater than a third distance threshold;
for each candidate image in the set of candidate images, removing, through the computer, the candidate image from the set of candidate images where the corresponding image location is outside a cone, wherein a point of the cone represents the current location and a center of the cone represents the target location;
for each candidate image in the set of candidate images, removing, through the computer, the candidate image from the set of candidate images where a distance between the corresponding image location and the target location is less than a fourth distance threshold; and
for each candidate image in the set of candidate images, removing, through the computer, the candidate image from the set of candidate images where the target location is closer to the current location than to the corresponding image location.

10. A computer system, comprising:
a processor;
a memory communicatively coupled to the processor; and
a map application (i) which executes in the processor from the memory and (ii) which, when executed by the processor, causes the computer system to provide an improved view of a location in a spatial environment by
displaying a current image associated with a current location of a geographic area, wherein the current image comprises a three-dimensional representation of the current location, the three-dimensional representation comprising a street-level photograph of the current location, global positioning system (GPS) data identifying the current location, and depth information identifying depths of objects in the street-level photograph,
receiving a user-selected point on the current image,
determining a target location of the geographic area based on the user-selected point,
determining a distance between the current location and the target location,
determining whether the distance between the current location and the target location is greater than a distance threshold,
in response to determining that the distance between the current location and the target location is greater than the distance threshold, performing a far distance process configured to determine and display a first target view of the target location where the distance is greater than the distance threshold by
retrieving a target image having a corresponding image location that is a shortest distance to the target location and is within a cone between the current location and the target location;
upon retrieving the target image, determining whether the target image is the current image;
in response to determining that the target image is the current image, performing a feedback event; and
in response to determining that the target image is not the current image, transitioning from displaying the current image to displaying the target image; and
in response to determining that the distance between the current location and the target location is not greater than the distance threshold, performing a near distance process configured to determine and display a second target view of the target location where the distance is not greater than the distance threshold by retrieving a set of candidate images within a second distance threshold from the target location;

penalizing and removing one or more candidate images from the set of candidate images according to criteria;

determining whether the set of candidate images contains at least one candidate image;

in response to determining that the set of candidate images does not contain at least one candidate image, performing a feedback event;

in response to determining that the set of candidate images contains at least one candidate image, selecting a target image from the set of candidate images having a lowest penalty and where a corresponding location is a shortest distance to the target location; and transitioning from displaying the current image to displaying the target image.

11. The computer system of claim 10, wherein determining a target location of the geographic area based on the user-selected point comprises determining the target location of the geographic area by intersecting the user-selected point with the GPS data and the depth information.

12. The computer system of claim 10, wherein performing a feedback event performing a zoom operation on the current image by decreasing a field of view.

13. The computer system of claim 10, wherein the map application, when executed by the processor, causes the computer system to provide an improved view of a location in a spatial environment by further determining an angle difference between the current location and the target location;

determining whether the angle difference is greater than an angle threshold;

in response to determining that the angle difference is greater than the angle threshold, performing the feedback event; and wherein retrieving the target image comprises in response to determining that the angle difference is not greater than the angle threshold, retrieving, through the computer, the target image from a plurality of images.

14. The computer system claim 10, further comprising the steps of:

determining a distance between the current location and the corresponding image location of the target image;

determining whether the distance between the current location and the corresponding image location is greater than another distance threshold;

in response to determining that the distance between the current location and the corresponding image location is greater than the another distance threshold, performing the feedback event; and in response to determining that the distance between the current location and the corresponding image location is not greater than the another distance threshold, transitioning from displaying the current image to displaying the target image.

15. The computer system of claim 10, wherein penalizing and removing one or more candidate images from the set of candidate images according to criteria comprises:

for each candidate image in the set of candidate images, penalizing the candidate image where an altitude of a corresponding image location is below an altitude of the current image;

for each candidate image in the set of candidate images, removing the candidate image from the set of candidate images where a distance between the corresponding image location and the target location is greater than a third distance threshold;

for each candidate image in the set of candidate images, removing the candidate image from the set of candidate images where the corresponding image location is outside a cone, wherein a point of the cone represents the current location and a center of cone represents the target location;

for each candidate image in the set of candidate images, removing the candidate image from the set of candidate images where a distance between the corresponding image location and the target location is less than a fourth distance threshold; and for each candidate image in the set of candidate images, removing the candidate image from the set of candidate images where the target location is closer to the current location than to the corresponding image location.

16. A non-transitory computer-readable storage medium having computer-executable instructions stored thereon which, when executed by a computer, cause the computer to:

display, through a computer having a memory and a processor, a current image associated with a current location of a geographic area, wherein the current image comprises a three-dimensional representation of the current location, the three-dimensional representation comprising a street-level photograph of the current location, global positioning system (GPS) data identifying the current location, and depth information identifying depths of objects in the street-level photograph, and wherein the depth information is generated based on light detection and ranging (LIDAR) data;

receive, through the computer, a user-selected point on the current image;

determine, through the computer, a target location of the geographic area based on the user-selected point;

determine, through the computer, a distance between the current location and the target location;

determine, through the computer, whether the distance between the current location and the target location is greater than a distance threshold;

in response to determining that the distance between the current location and the target location is greater than the distance threshold, perform, through the computer, a far distance process configured to determine and display a first target view of the target location where the distance is greater than the distance threshold; and in response to determining that the distance between the current location and the target location is not greater than the distance threshold, perform, through the computer, a near distance process configured to determine and display a second target view of the target location where the distance is not greater than the distance threshold by retrieving, through the computer, a set of candidate images within a second distance threshold from the target location by penalizing and removing, through the computer, one or more candidate images from the set of candidate images according to criteria;

determining, through the computer, whether the set of candidate images contains at least one candidate image;

in response to determining that the set of candidate images does not contain at least one candidate image, performing, through the computer, a feedback event;

in response to determining that the set of candidate images contains at least one candidate image, selecting, through the computer, a target image from the set of candidate images having a lowest penalty and where a corresponding image location is a shortest distance to the target location; and transitioning, through the computer, from displaying the current image to displaying the target image.

17. The computer-readable storage medium of claim 16, wherein to perform, through the computer, a far distance process configured to determine and display a first target view of the target location where the distance is greater than a distance threshold, the computer-readable storage medium having computer-executable instructions stored thereon which, when executed by the computer, cause the computer to:

retrieve, through the computer, a target image having a corresponding image location that is a shortest distance to the target location and is within a cone between the current location and the target location;

upon retrieving the target image, determine, through the computer, whether the target image is the current image;

in response to determining that the target image is the current image, perform, through the computer, a feedback event; and in response to determining that the target image is not the current image, transition, through the computer, from displaying the current image to displaying the target image.

\* \* \* \* \*